(12) United States Patent
Karlinger

(10) Patent No.: US 7,520,473 B2
(45) Date of Patent: Apr. 21, 2009

(54) DEVICE FOR GUIDING FLEXIBLE ELEMENTS ALONG MOVABLE MACHINE PARTS

(75) Inventor: Stefan Karlinger, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 697 days.

(21) Appl. No.: 11/106,110

(22) Filed: Apr. 14, 2005

(65) Prior Publication Data

US 2005/0236528 A1    Oct. 27, 2005

(30) Foreign Application Priority Data

Apr. 23, 2004    (DE) .................. 10 2004 019 838

(51) Int. Cl.
*F16L 3/00*    (2006.01)
(52) U.S. Cl. ................... 248/49; 174/68.1
(58) Field of Classification Search .......... 248/49, 248/51, 52; 191/12 C, 12 R; 174/68.1, 69, 174/99 E, 135, 117 F, 117 FF, DIG. 9
See application file for complete search history.

(56) References Cited

U.S. PATENT DOCUMENTS

| | | | |
|---|---|---|---|
| 2,510,055 A * | 6/1950 | Aves | 248/51 |
| 3,227,802 A * | 1/1966 | Pressley Jr. | 174/650 |
| 3,630,325 A | 12/1971 | Corl et al. | |
| 3,682,078 A * | 8/1972 | Parker et al. | 396/611 |
| 3,853,148 A * | 12/1974 | De Vincent et al. | 138/110 |
| 4,076,272 A * | 2/1978 | Penton | 280/421 |
| 5,156,349 A * | 10/1992 | Wilson et al. | 242/388.9 |
| 6,230,859 B1 * | 5/2001 | Springmann | 191/12 R |
| 6,684,731 B1 * | 2/2004 | Karlinger | 74/490.02 |
| 6,811,124 B2 | 11/2004 | Karlinger | |
| 6,930,244 B1 * | 8/2005 | Nebel | 174/486 |

FOREIGN PATENT DOCUMENTS

| | | |
|---|---|---|
| DE | 1 173 761 | 7/1964 |
| DE | G 92 17 659.3 U1 | 5/1994 |
| DE | 197 10 450 | 6/1998 |
| EP | 1 043 530 A2 | 10/2000 |
| EP | 1 304 195 A1 | 4/2003 |
| EP | 1 369 211 A1 | 12/2003 |
| JP | 04217487 | 8/1992 |

* cited by examiner

*Primary Examiner*—Korie H. Chan
(74) *Attorney, Agent, or Firm*—McGlew and Tuttle, P.C.

(57) ABSTRACT

A device (1) is proposed for guiding elongated, flexible elements (2) along parts (6.1, 6.2) of a machine (6) movable relative to one another. The flexible elements (2) can e.g. be power supply cables bunched in a hose for a tool of a multi-axial industrial robot (6), which are guided along the axes of the latter. A device (1) according to the invention is characterized by a sheet blank (1.1) located on the surface of a machine part (6.1) for creating a fixing face (1.1g) for machine attachment (7) spaced from said surface. At least one flexible element (2) is held and guided in a gap 1.1d) between the surface and the fixing face (1.1g). As a result of the thus created, layered or superimposed arrangement of machine attachments (7) and flexible elements (2) guided on the machine space conflict between the same is avoided.

23 Claims, 5 Drawing Sheets

DEVICE FOR GUIDING FLEXIBLE ELEMENTS ALONG MOVABLE MACHINE PARTS

FIELD OF THE INVENTION

The invention relates to a device for guiding elongated, flexible elements along machine parts movable relative to one another, such as power supply cables bunched in a hose along the axes of a multiaxial industrial robot.

BACKGROUND OF THE INVENTION

Machines with parts movable relative to one another, such as multiaxial industrial robots, regularly have flexible elements located externally with respect to the machine and in particular hoses and/or cables for the supply of power and media of attached parts guided through the machine, such as tools or the like. For example the robot hand of a multiaxial industrial robot regularly carries such a tool, e.g. welding tongs, which is supplied with power by means of cable and hose connections passing externally of the robot.

Known power supply leads of the indicated type are generally positioned laterally close to the robot structure and in particular run on the robot towards the hand thereof. Holding or retaining parts fixed to the robot structure are used for guiding the lead and these regularly have angle plates fixed to the robot structure and clamping elements located on said plates, said elements being used for holding and guiding the flexible elements.

A particularly disadvantage of the known device is that machine attachments, e.g. a compressed air control valve provided by a user on the machine for fixing reasons take up the same construction space as the aforementioned, conventional power supply leads. Thus, a space conflict occurs, which normally makes necessary cost-intensive, design-complex individual solutions, regularly associated with an unfavourable spatial path of said flexible elements.

Whilst avoiding the aforementioned disadvantages, the problem of the invention is to so further develop a device of the aforementioned type that no spatial hindrances occur when additionally providing machine attachments, the device according to the invention and in particular a path of the elongated, flexible elements guided by the same being characterized by space-saving compactness.

SUMMARY OF THE INVENTION

In the case of a device of the aforementioned type, the set problem is solved by a sheet blank located on a machine part for creating a mounting face for machine attachments spaced from a surface of the machine part and where at least one flexible element is held and guided with a gap between the surface and the mounting face.

Therefore the device according to the invention makes available for machine attachments an additional mounting or fixing face spaced from the machine surface, so that said attachments can be located in a substantially unchanged position relative to the machine, without there being any spatial conflict situation in connection with the arrangement and guidance of flexible elements along the machine.

In order to be able to substantially maintain an orientation of the machine attachments relative to the machine, according to a further development of the inventive device, the fixing face is oriented substantially parallel to the machine part surface.

Advantageously the sheet blank of the device according to the invention has at least one first leg engaging on the surface of the machine part and a second leg forming the fixing face, the first and second legs being interconnected by means of at least one crosspiece oriented perpendicular to in each case one of the first and second legs. Thus, the sheet blank has in particular a U-shaped configuration, the flexible element being held and guided in the gap between the first and second free legs of the U. The inner walls of the legs are advantageously smooth and have no disturbing projections, so that during its guidance within the sheet blank, the flexible element can move in obstacle-free manner at least within the gap bounded by the legs.

Alternatively two plates corresponding to the legs are kept spaced by rod-shaped spacers.

According to a further development of the inventive device, two holding elements for the flexible element are located in the gap and ensure that the flexible element assumes a clearly defined position within the inventive device. Preferably the flexible element is held fixed by the first holding element with respect to movements in its extension direction and rotations about its extension direction. Thus, according to the invention, the first holding element is that where the flexible element in a spatially defined manner enters the inventive device, e.g. coming from a robot base, if the inventive device is located in the vicinity of a robot arm.

In order to form a length reserve for the flexible element, which is regularly necessary as a result of the relative mobility of the machine parts, according to a highly preferred further development of the inventive device, the flexible element between the holding elements has an arcuate path, an angular dimension of the arcuate path being at least 90° and preferably between 150 and 210° and in particularly preferred manner approximately 180°. According to a further development of the inventive device, the second holding element has an opening receiving the flexible element and its internal diameter is larger than an external diameter of the flexible element. Thus, whereas the flexible element is kept fixed on the first holding element, the opening of the second holding element only fulfils a lateral guidance function and in the case of movements of corresponding machine parts the flexible element can be extracted and returned through the opening enabling the flexible element to be adapted to said machine movements.

Another highly preferred development of the inventive device is characterized by spring means in operative connection with the flexible element in an area between the holding elements. According to the invention and as indicated hereinbefore, the spring means can be tensioned in the case of a forced movement of the flexible element through the opening of the second holding element and consequently brings about a return movement thereof on relieving the flexible element. Thus, on relieving the flexible element, due to a corresponding movement of the machine (machine parts), there is an automatic return movement of the flexible element through the opening of the second holding element into the gap of the inventive device.

According to the invention the spring means can be a leaf spring, which is positioned preferably parallel to a path of the flexible element and additionally or alternatively has its one end fixed to the first holding element. An alternative construction of the inventive device provides for the spring means to be a helical spring substantially concentrically surrounding the flexible element and whose external diameter is larger than the internal diameter of the opening of the second holding element. An abutment for the helical spring can be provided on the flexible element in an area between the holding elements and said helical spring is preferably located between the abutment and the second holding element.

In order to easily fix the inventive device to the machine in question, e.g. a multiaxial industrial robot, the first leg of the sheet blank preferably has first holes for fixing the latter to the machine. In order to advantageously allow a simultaneous fixing of both the machine attachments to the inventive fixing face and/or to the machine and also the sheet blank to the machine, according to a highly preferred further development of the inventive device the second leg has corresponding second holes directly above the first holes in the first leg. In this way it is ensured that as a result of the superimposed pairs of first and second holes the sheet blank can be fixed to the machine and at the same time machine attachments to the sheet blank.

If a radius of the arcuate path of the flexible element within the inventive device drops below a double minimum bending radius of the flexible element, according to a further development of the inventive device the sheet blank has a cross-section closed on all sides and the cross-section can specifically be rectangular. As a result, by means of the side walls of the closed sheet blank, a lateral compulsive force can be exerted on the flexible element, so that it permanently assumes a curved configuration with a bending radius below the minimum bending radius given by the hose manufacturer as the dynamic minimum bending radius of the flexible element.

BRIEF DESCRIPTION OF THE DRAWINGS

Further characteristics and advantages of the invention can be gathered from the following description of embodiments and the attached drawings, wherein show.

DETAILED DESCRIPTION OF THE DRAWINGS

Figure 1:
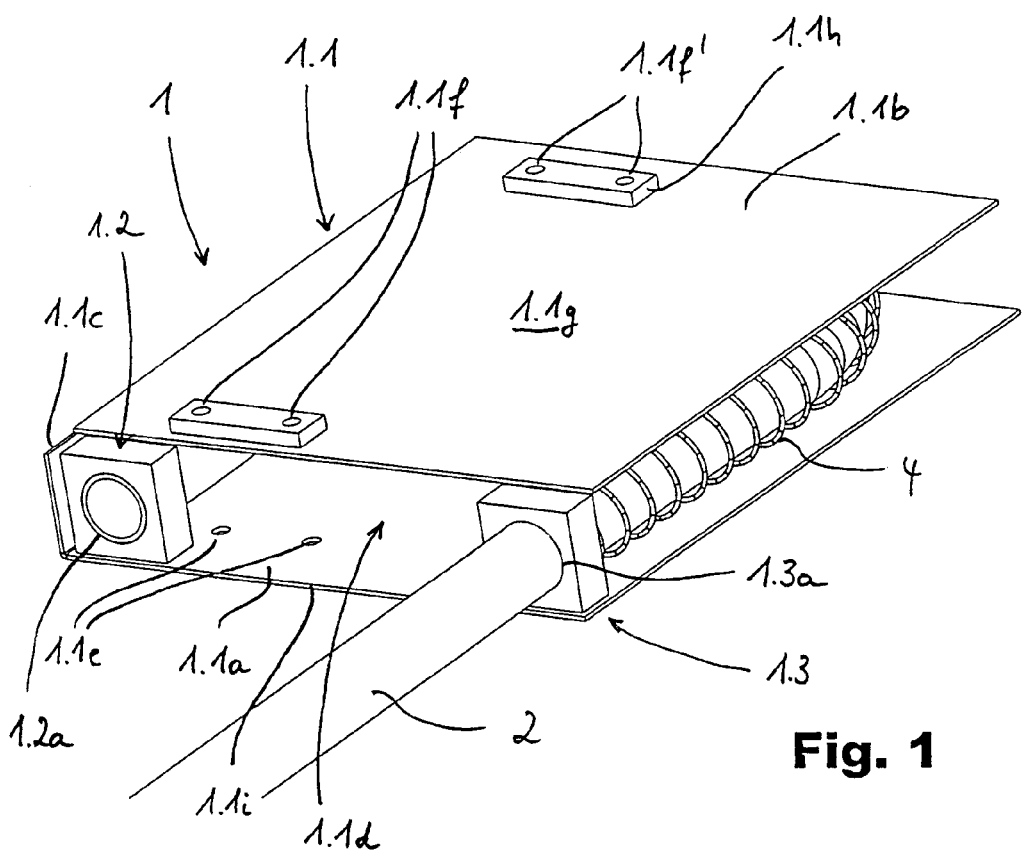
FIG. 1 A perspective overall view of a device according to the invention.

FIG. 1 is a perspective overall view of a device 1 according to the invention for guiding elongated flexible elements, here a guide hose 2 for the power supply of a not shown robot. The device 1 has a sheet metal blank 1.1 which, according to FIG. 1, has a substantially U-shaped cross-section and which is formed by a first leg 1.1a, a second leg 1.1b parallel thereto and a crosspiece 1.1c, the latter being oriented perpendicular to the legs 1.1a. Between the legs 1.1a, 1.1b of the sheet blank 1.1 is defined by the height H of the crosspiece 1.1c a gap 1.1d in which is at least partially located the hose 2. The sheet blank 1.1 can be in one or several parts.

The first leg 1.1a of the sheet blank 1 has in the embodiment shown holes 1.1e by means of which the sheet blank 1.1 and therefore the inventive device 1 can be fixed to a not shown surface of a robot. Besides the holes 1.1e, in the second leg 1.1b are provided further holes 1.1f, 1.1f', which are located directly above the holes 1.1e in the first leg 1.1a, but in FIG. 1 only the pair of holes 1.1e, 1.1f can be seen. In this way not shown machine attachments located on a surface 1.1g of the second leg 1.1b serving as the fixing face can be fixed, via pairs of holes 1.1e, 1.1f, together with the sheet blank 1.1 to the robot. For spacing the machine attachments from the surface 1.1e of the second leg 1.1b, e.g. for vibration uncoupling, spacers 1.1h are provided in the vicinity of the holes 1.1f, 1.1f' on surface 1.1g.

Hose 2 is held on the sheet blank 1.1 by two holding elements 1.2, 1.3. The holding elements 1.2, 1.3 are located on a lateral edge 1.1i of the first leg 1.1a with a spacing L' and in each case have an opening 1.2a, 1.3a for the passage of the hose 2. The holding elements 1.2, 1.3 are oriented in such a way that, after passing through the opening 1.2a of the first holding element 1.2, the hose 2 has in the gap 1.1d of the sheet blank 1.1 a curved path, the angular dimension α of the arc B (cf. FIG. 2a) in the embodiment shown being approximately 180°, before the hose 2 passes out of the gap 1.1d of the sheet blank 1.1 through the opening 1.3a of the second holding element 1.3.

Figure 2A:
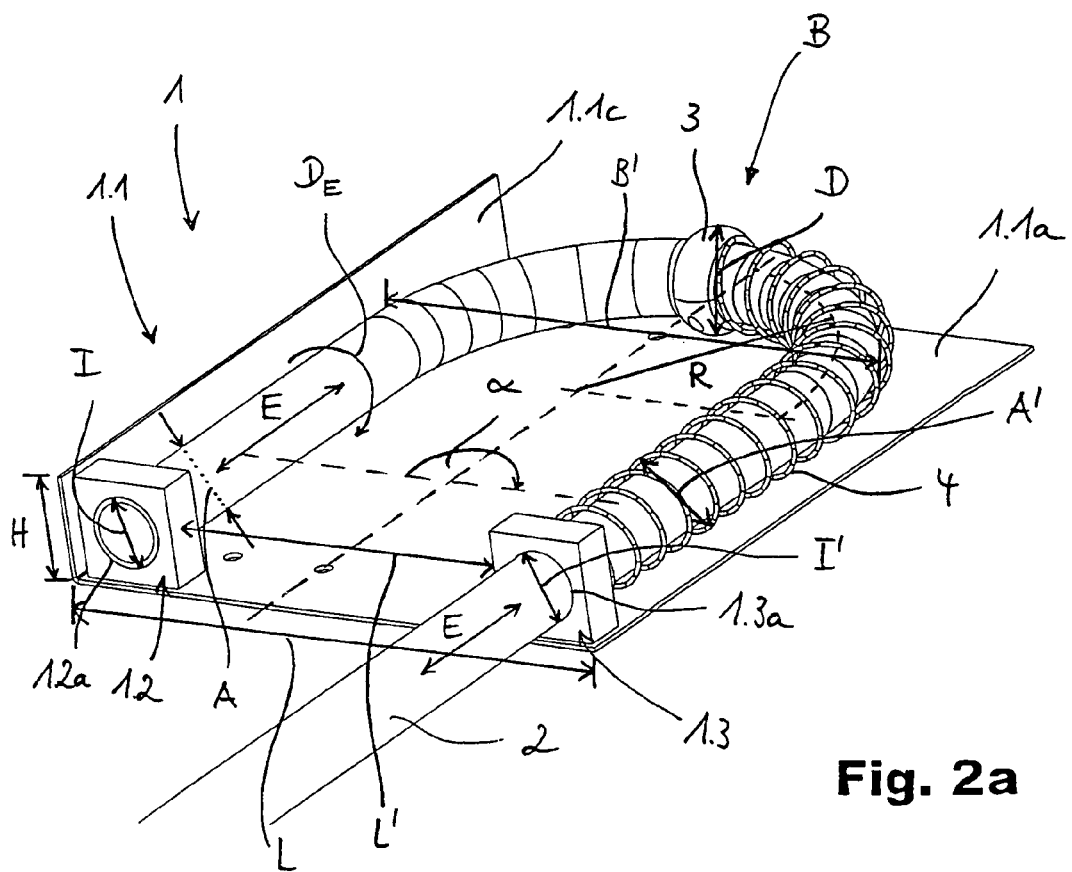
FIG. 2a The device of FIG. 1 in a representation without the upper, second leg in a first embodiment with a helical spring.

The described path of the hose 2 within the sheet blank 1.1 can in particular be gathered from FIG. 2a, which is a view of the inventive device 1 corresponding to FIG. 1, but in which the second, upper leg 1.1b of the sheet blank 1.1 has been blanked out. As can be seen in FIG. 2a, within the sheet blank 1.1, the hose 2 describes an arc B with α=180° and a bending radius R, which in the embodiment shown is larger than a minimum bending radius $R_{min}$ (not shown) of the hose 2.

By the first holding element 1.2 the hose 2 is kept fixed in its opening 1.2a with respect to movements in its extension direction E and rotations DE about an extension direction E (cf. arrows in FIG. 2a). This is inventively brought about in that an internal diameter I of the opening 1.2a of the first holding element 1.2 is smaller than an external diameter A of the hose 2 prior to introduction into the opening 1.2a.

The second holding element 1.3 has an opening 1.3a receiving the hose 2 and whose internal diameter I' is larger than the external diameter A of the hose 2, so that at least in its extension direction E the hose 2 can move substantially freely through the opening 1.3a of the second holding element 1.3.

Between an annular collar 3 located in the vicinity of the arc B and the second holding element 1.3 around hose 2 is provided a helical spring 4 which concentrically surrounds it. The ring collar 3 and holding element 1.3 in each case serve as abutments for the helical spring 4. For this purpose the helical spring 4 has an external diameter A' larger than the internal diameter I' in the opening 1.3a of the second holding element 1.3.

In the represented variant of the device 1 the length L of the first leg 1.1a and the second leg 1.1b of the sheet blank 1.1 is chosen in such a way that it at least corresponds to a corresponding bending width B' of the hose arc B B'=2·R+(A'+A)/2 (cf. FIG. 2a) or B'=2·R+(D+A)/2 for D>A', in which D is a diameter of the collar 3. Correspondingly a height H of the crosspiece 1.1c is at least H=A' or H=D, which ensures free mobility of the hose 2 within the sheet blank.

FIG. 2a shows the helical spring 4 in its undeflected rest state, i.e. it is untensioned. According to the variant of the inventive device shown, in the case of a forced movement of the hose 2 through the opening 1.3a of the second holding element 1.3, e.g. as a result of a tensile force acting on the hose during robot movement, said helical spring 4 can be tensioned (contracted), so that on relieving the hose 2 there is a restoring force acting on the ring collar 3, which brings about a return movement of the hose 2 through the opening 1.3a of the second holding element 1.3. Thus, the portion of the hose 2 located in the inner space 1.3b of the inventive sheet blank 1.1 serves as a length reserve for the hose 2 during robot movements.

Figure 2B:
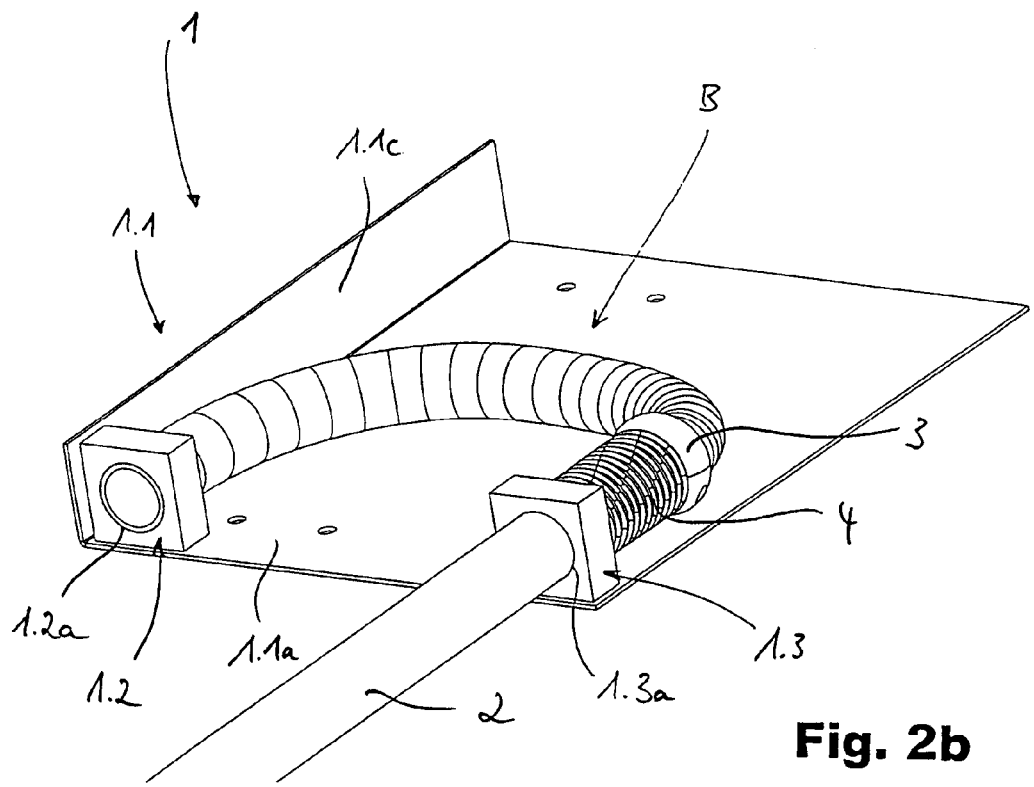
FIG. 2b The device of FIG. 2a with a stretched, flexible element.

FIG. 2b is a representation corresponding to FIG. 2a of the above-described, stretched state of the hose 2. According to FIG. 2b, the helical spring 4 has a maximum compression, so that a further extraction of the hose 2 from the inner space 1.1d of the sheet blank 1.1 is no longer possible. On loading the hose 2, as a result of the restoring force provided by the helical spring, it moves back into the starting position shown in FIG. 2a.

Figure 3A:
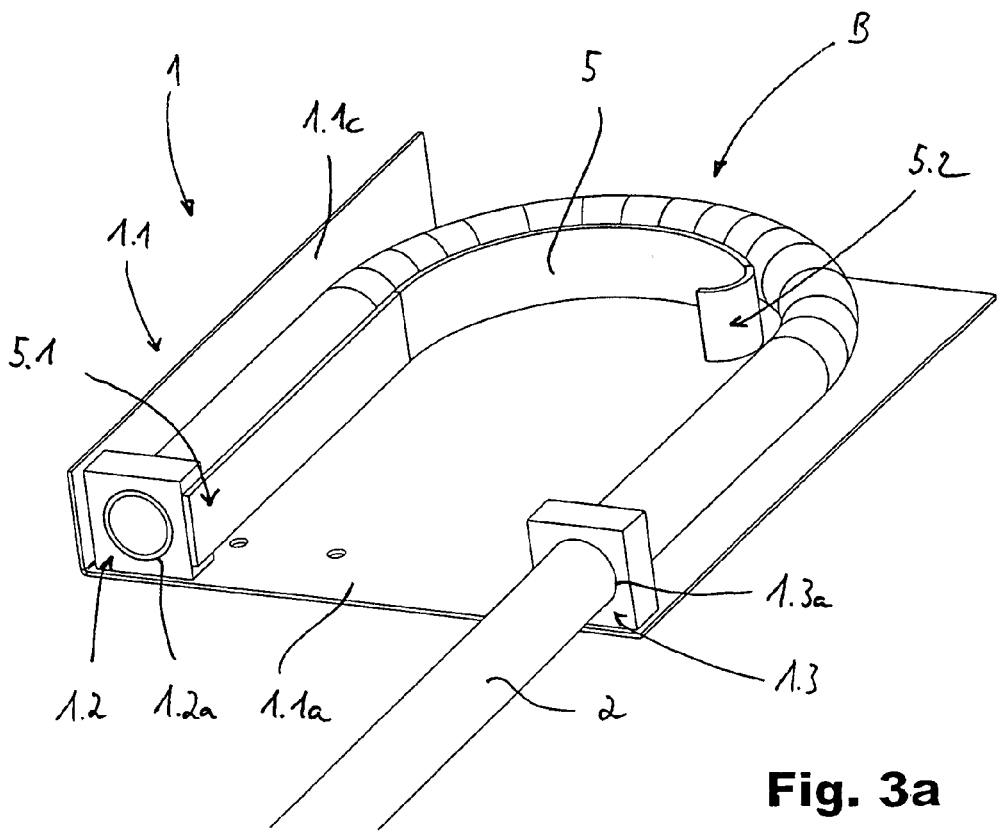
FIG. 3a A further development of the inventive device with a leaf spring.

FIG. 3a shows an alternative variant of the inventive device 1, in which a leaf spring 5 is used in place of the helical spring 4 (FIGS. 1-2b) as the spring means. The leaf spring 5 is substantially parallel to the path of the hose 2 and its first end 5.1 is fixed, e.g. riveted, welded or screwed to the first element 1.2. At its free end 5.2 the leaf spring 5 has an inward curvature in order not to damage the hose 2 by contact.

Within the framework of the present invention, the leaf spring 5 fulfils the same function as the helical spring 4 described in detail hereinbefore, FIG. 3a showing the rest state (undeformed state) of the leaf spring 5.

Figure 3B:
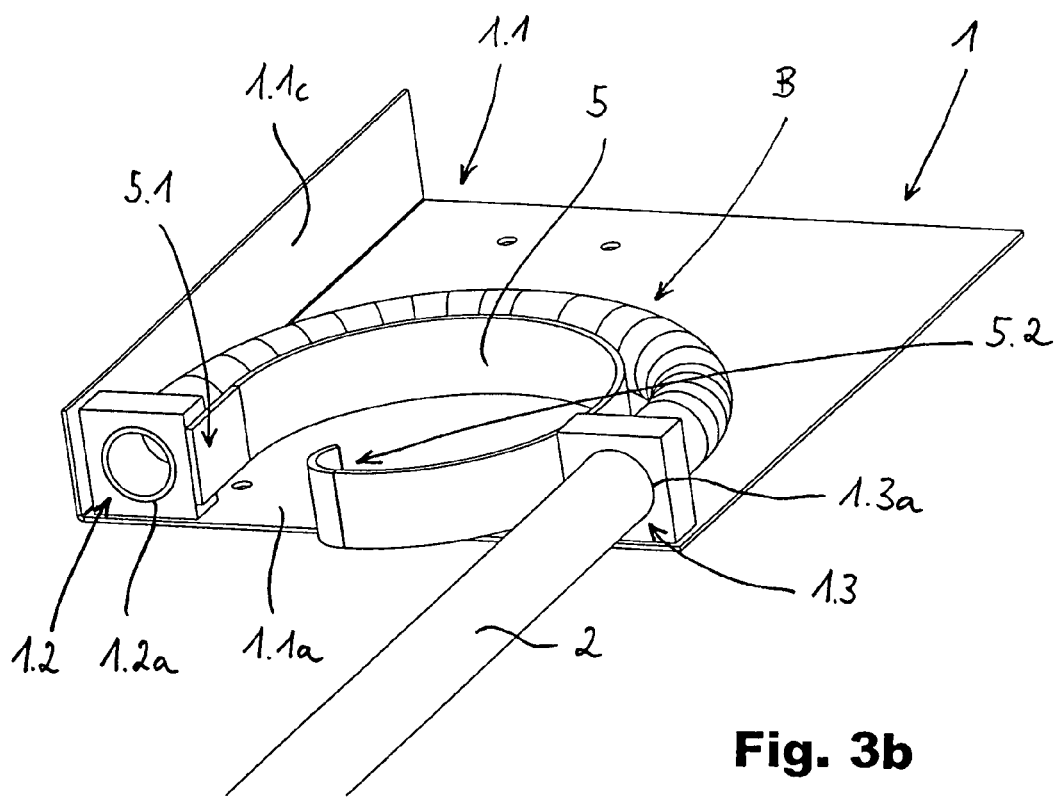
FIG. 3b The device of FIG. 3a with a stretched, flexible element.

Corresponding to the representation in FIG. 2b, FIG. 3b shows the state which occurs when the hose 2 is drawn out of the inner space 1.1d of the sheet blank 1.1, once again e.g. through a movement of the robot. On relieving the hose 2, the leaf spring 5 exerts a restoring force on the hose 2, so that the latter is moved back into the starting position of FIG. 3a.

According to a not shown, alternative development of the inventive device 1, the sheet blank 1.1 can have a further, not shown leg, which is preferably oriented parallel to the crosspiece 1.1c, so that a cross-sectionally rectangular, closed shape arises for the sheet blank 1.1. Such a variant is particularly advantageous if as a result of a corresponding dimension L of the first leg 1.1a and second leg 1.1b or a corresponding spacing L' of the holding elements 1.2, 1.3 there is a bending radius R for the hose 2 which is smaller than the dynamic minimum bending radius $R_{dyn}$ established by the material parameters of the hose 2. In this case the fourth leg of the sheet blank 1.1 together with the base 1.1c prevents a lateral breaking out of the hose 2 as a result of dropping below the minimum bending radius.

Figure 4A:
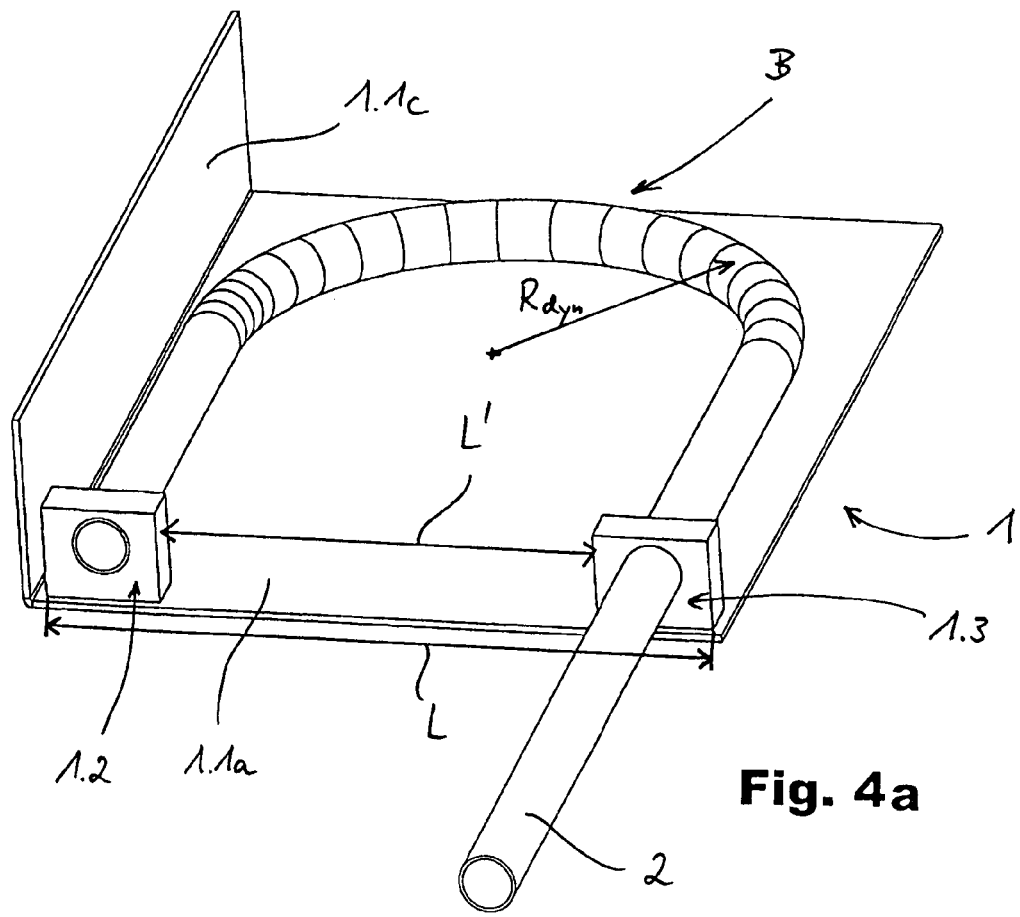
FIG. 4a-c Further developments of the inventive device on varying the bending radius of the flexible element.
Figure 4B:
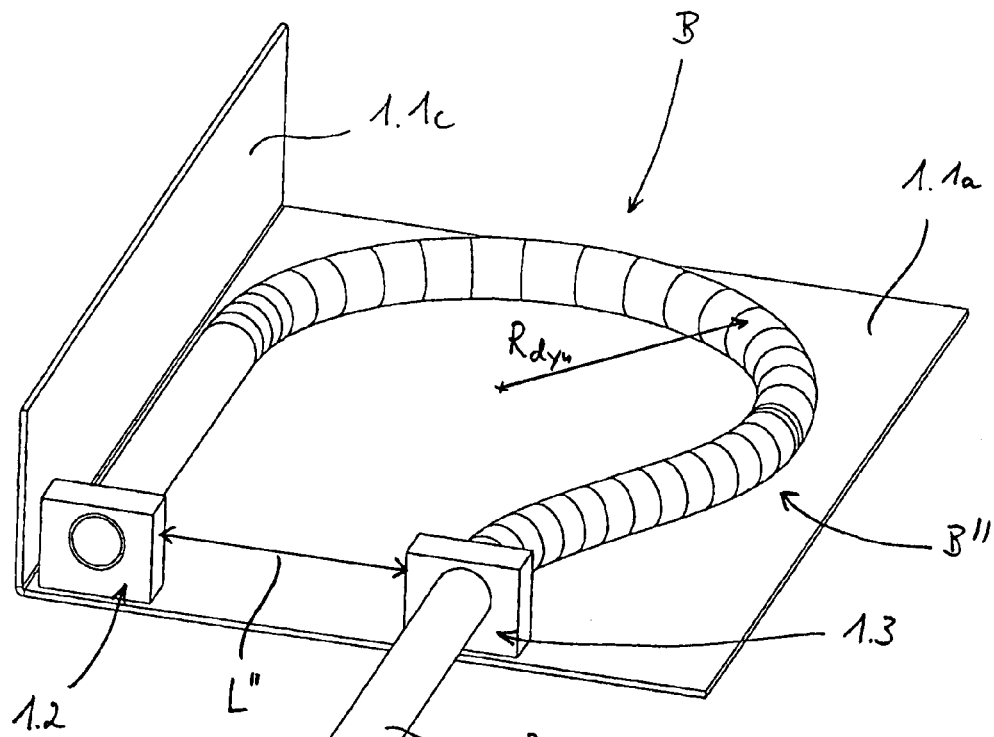
Figure 4C:
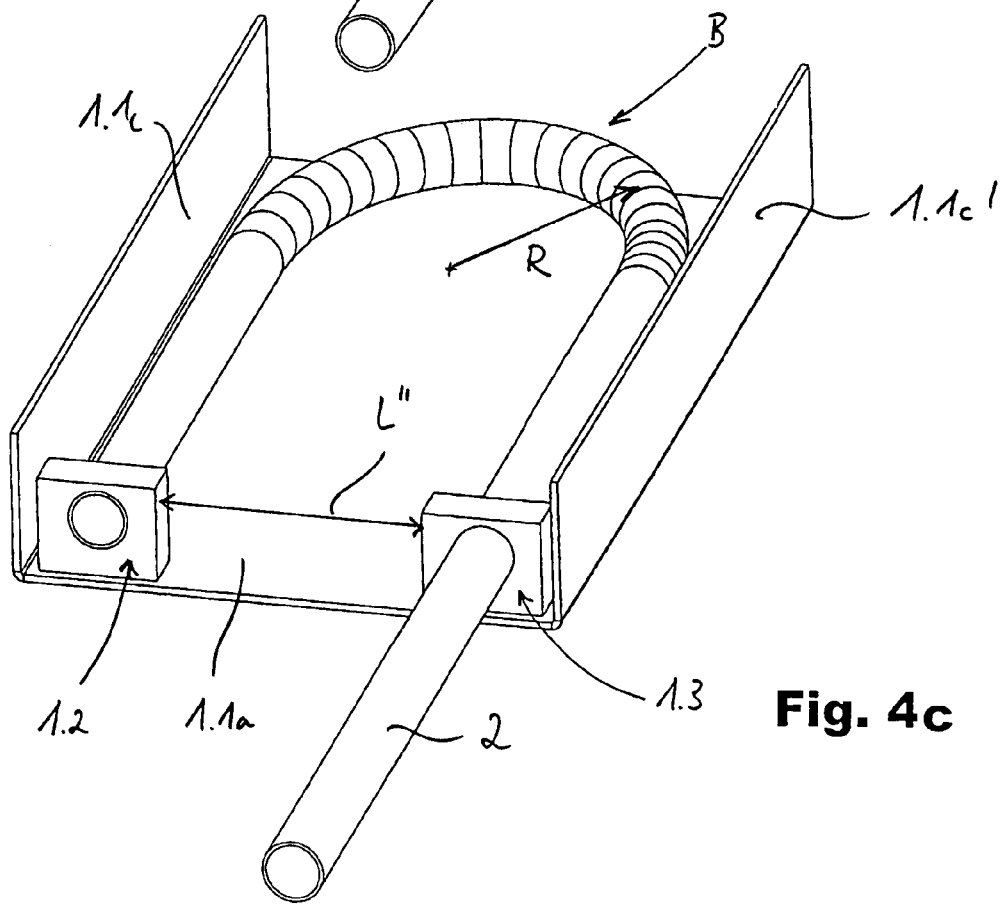

This is shown hereinafter in FIG. 4a-c. FIG. 4a shows a device 1 in which the spacing L' of the holding elements 1.2, 1.3 is chosen in such a way that in the vicinity of the arc B the hose 2 curves with the predetermined, dynamic minimum bending radius $R_{dyn}$. If in the manner shown in FIG. 4b the spacing L" between the holding elements 1.2, 1.3 is reduced, e.g. for space reasons, the hose 2 would tend to still maintain the radius $R_{dyn}$ and as a result in area B" there would be a bulging out of said hose 2. To prevent this, according to the invention and as shown in FIG. 4c, there is a further crosspiece 1.1c' with a support function of the hose 2 and which compresses the later making it possible to attain a smaller bending radius R than the predetermined, dynamic minimum bending radius $R_{dyn}$.

Figure 5A:
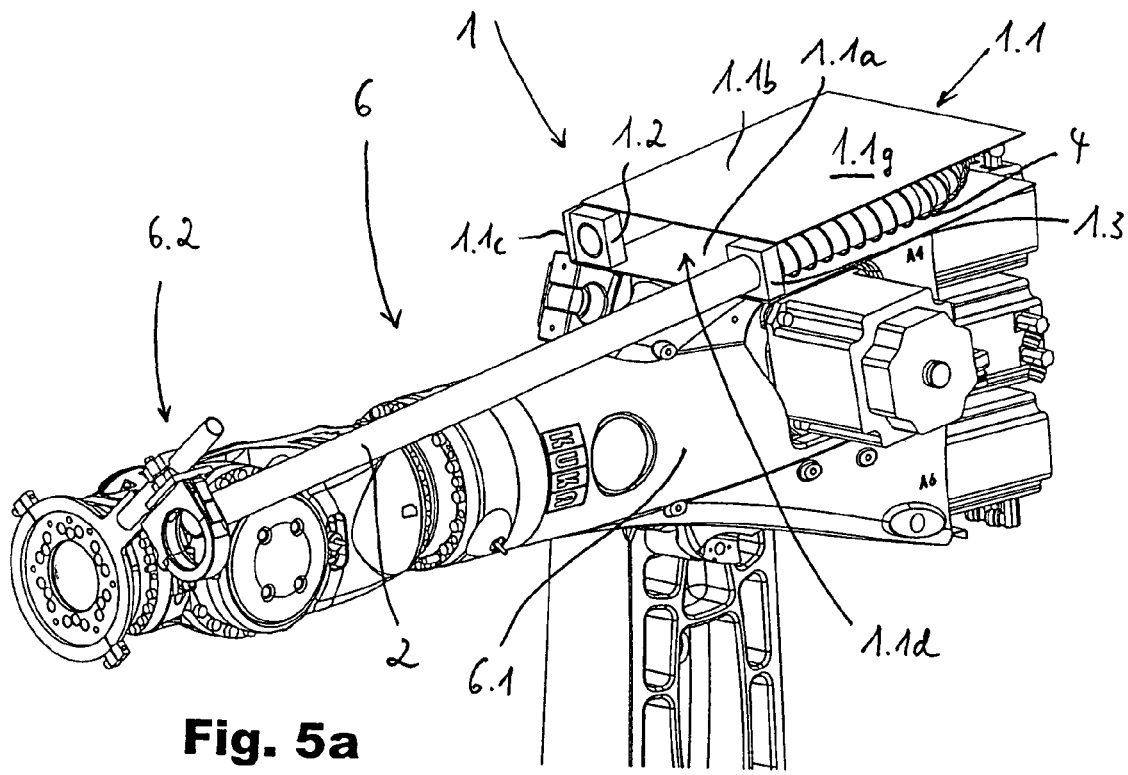
FIG. 5a The arrangement of an inventive device on a multiaxial industrial robot.

FIG. 5a shows the arrangement of an inventive device 1 in the vicinity of the A3 axis of a multiaxial industrial robot 6. The sheet blank 1.1 is placed on a not visible surface in the rear area of the robot arm 6.1. The hose 2 is guided forwards in the vicinity of the robot hand 6.2 and serves in conventional manner to supply power to a not shown tool connected to the robot hand 6.2.

Figure 5B:
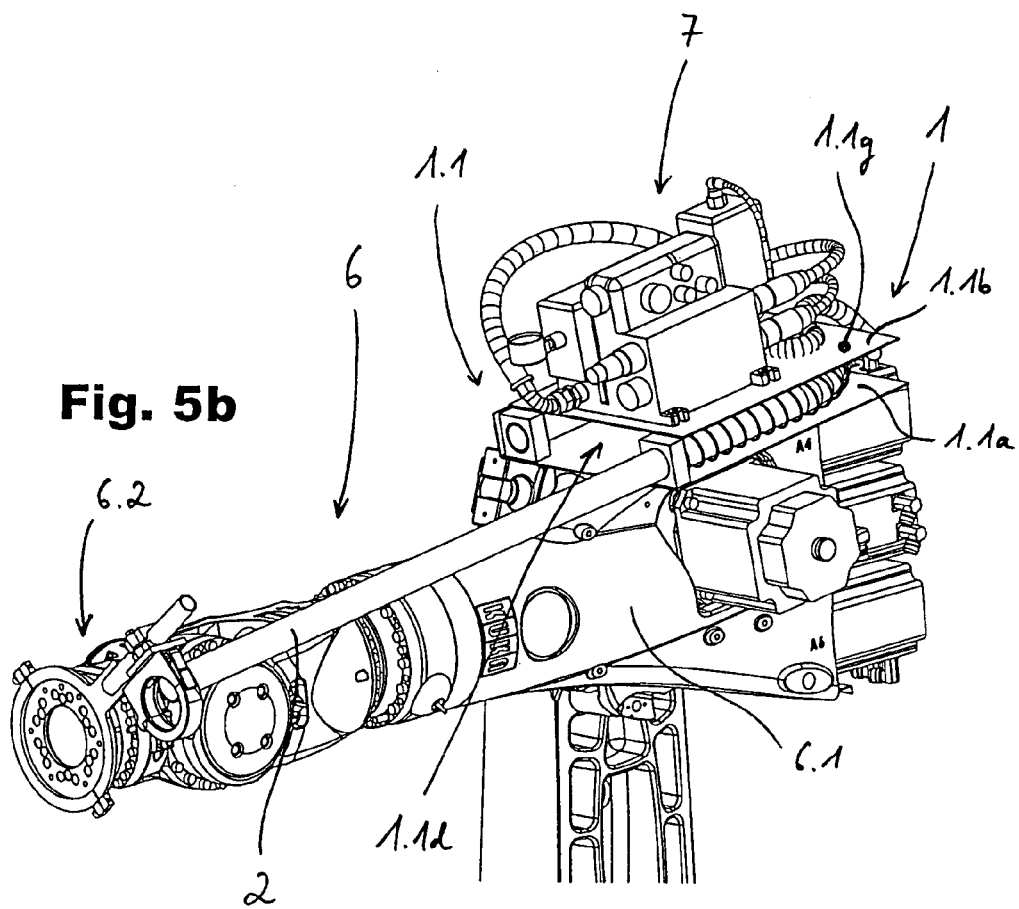
FIG. 5b A representation according to FIG. 4a with a machine attachment fixed to the device according to the invention.

FIG. 5b shows a representation, substantially corresponding to FIG. 5a, of the inventive device 1 equipping the robot 6, where on the surface 1.1g of the second leg 1.1b and which according to the invention serves as a fixing face, are provided machine attachments in the form of a proportional control valve 7 for compressed air control purposes. As can be gathered from FIG. 5b, when using the inventive device 1 there is no space competition between the hose 2 for supplying power to the robot tool and the machine attachment 7 as a result of the layered arrangement in the vicinity of the inventive device 1, although the power supply and the attachment 7 take up the same construction space with respect to the robot 6.

REFERENCE NUMERALS LIST

1 Device
1.1 Sheet blank
1.1a First leg
1.1b Second leg
1.1c, 1.1c' Crosspiece
1.1d Gap
1.1e, 1.1f, 1.1f' Hole
1.1g Surface
1.1h Spacer
1.1i Edge
1.2, 1.3 Holding element
1.2a, 1.3a Opening
2 Hose
3 Collar
4 Helical spring
5 Leaf spring
5.1, 5.1 End
6 Robot
6.1 Robot arm
6.2 Robot hand
7 Machine attachments
A, A' External diameter
B Arc
B' Bending width
B" Bulge
D Diameter
DE Rotation direction
E Extension direction
H Height
I, I' Internal diameter
L Length
L', L" Spacing
R Bending radius
$R_{min}$ Minimum bending radius
$R_{dyn}$ Dynamic bending radius
α Angular dimension

The invention claimed is:

1. A device for guiding elongated, flexible elements as energy guides, along parts of a machine movable relative to one another, the device comprising:

a machine part having a machine part surface;
a sheet blank located on said machine part, said sheet blank defining a mounting surface, said mounting surface being attached to said machine part, said mounting surface being located at a spaced location from said machine part surface of said machine part, wherein said mounting surface and said machine part surface define a gap;
a spring;
a flexible element guided in said gap, said spring extending along a portion of said flexible element such that said spring is parallel to said portion of said flexible element, said flexible element being fixed at one end in said gap, another end of said flexible element being movable with respect to said spring from a resting position to an extended position, said spring being in a compressed state when said another end of said flexible element is in said extended position such that said spring exerts a holding force on said portion of said flexible element.

2. A device according to claim 1, wherein mounting surface is oriented substantially parallel to said machine part surface of said machine part.

3. A device according to claim 1, wherein the sheet blank comprises a crosspiece, a first leg and a second leg, said second leg forming said mounting surface, said first leg engaging said machine part surface of said machine part, said first leg and said second leg being connected via said crosspiece, said crosspiece being perpendicular to said first leg and said second leg.

4. A device according to claim 1, wherein a first holding element and a second element are located in said gap for holding said flexible element.

5. A device according to claim 4, wherein said one end of said flexible element is fixed by said first holding element such that said one end of said flexible element does not move in an extension direction and does not rotate about said extension direction.

6. A device according to claim 4, wherein said flexible element extends along an arcuate path between the holding elements.

7. A device according to claim 6, wherein an angular dimension ($\alpha$) of the arcuate path is at least 90°.

8. A device according to claim 6, wherein an angular dimension ($\alpha$) of the arcuate path is approximately 180°.

9. A device according to claim 4, wherein said second holding element has an opening receiving said flexible element, said opening of said second holding element having an internal diameter, said internal diameter of said opening being greater than an external diameter of said flexible element.

10. A device according to claim 4, wherein said spring is in operative connection with said flexible element in an area between said first holding element and said second holding element.

11. A device according to claim 9, wherein said spring moves at least a length of said flexible element into said gap when said flexible element moves from said extended position to said rest position.

12. A device according to claim 10, wherein said spring is a leaf spring.

13. A device according to claim 12, wherein said machine part is a multiaxial industrial robot, said flexible element comprises power supply cables, said power supply cable delivering power to said multiaxial industrial robot.

14. A device according to claim 12, wherein one end of said leaf spring is fixed to said first holding element.

15. A device according to claim 9, wherein said spring is a helical spring, said helical spring substantially concentrically surrounding said flexible element, said helical spring having an external diameter, said external diameter being greater than said internal diameter of said opening of said second holding element.

16. A device according to claim 15, wherein an abutment for the helical spring is located on said flexible element in an area between said first holding element and said second holding element.

17. A device according to claim 16, wherein said helical spring is located between said abutment and said second holding element.

18. A device according to claim 3, wherein said first leg has first holes for fixing said sheet blank to said machine part.

19. A device according to claim 18, wherein said second leg has second holes located directly above said first holes in said first leg, each of said second holes being aligned with one of said first holes.

20. A device according to claim 19, wherein said sheet blank is fixed to said machine part vis said first holes and said sheet blank is fixed to machine attachments via said second holes.

21. A device according to claim 1, wherein said sheet blank has a cross-section closed on all sides.

22. A device according to claim 21, wherein the cross-section is rectangular.

23. A device for guiding elongated, flexible elements as energy guides, along parts of a machine movable relative to one another, the device comprising:

a sheet blank comprising a bottom element, a top element and a side element, said bottom element being connected to said top element via said side element, said bottom element, said top element and said side element defining a flexible element portion receiving space;

a first holding element connected to said bottom element, said first holding element having a first holding element opening;

a second holding element connected to said bottom element, said second holding element being located at a spaced location from said first holding element, said second holding element having a second holding element opening;

a flexible element having a first end, said first holding element opening receiving said first end of said flexible element such that said first end is in a fixed position, said second holding element opening receiving a portion of said flexible element such that a second end of said flexible element is movable from a non-extended position to an extended position, said portion of said flexible element having a flexible element portion length; and a spring located in said flexible element portion receiving space, said spring having a first spring end, said spring extending along a portion of said flexible element portion length, said first spring end engaging one of said first holding element and said second holding element, said spring being movable from said compressed state to a non-compressed state, said spring being in said compressed state when said flexible element is in said extended position such that said spring retains said portion of said flexible element within said flexible element portion receiving space, said spring moving a length of said flexible element into said flexible element portion receiving space when said spring moves from said compressed state to said non-compressed state, said flexible element being in said non-extended state when said spring is in said non-compressed state.

* * * * *